No. 754,231. PATENTED MAR. 8, 1904.
G. E. NETTLETON.
CLINICAL THERMOMETER HOLDER.
APPLICATION FILED OCT. 22, 1903.
NO MODEL.
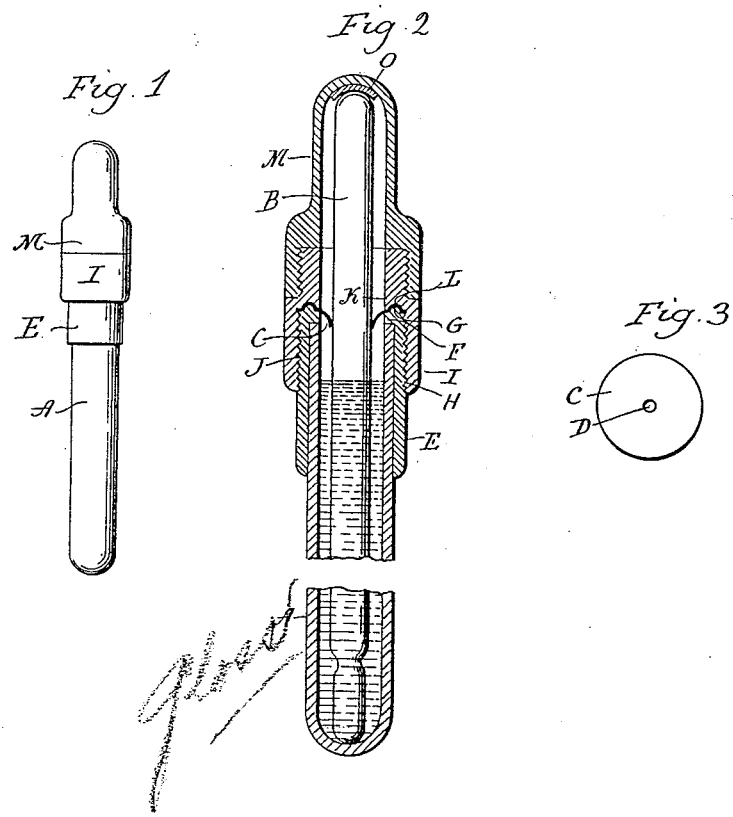

ONE-HALF TO ELISHA HE[...], OF NEW HAVEN, CONNECTICUT.

CLINICAL-THERMOMETER HOLDER.

SPECIFICATION forming part of Letters Patent No. 754,231, dated March 8, 1904.

Application filed October 22, 1903. Serial No. 178,160. (No model.)

*To all whom it may concern:*

Be it known that I, GEORGE E. NETTLETON, of New Haven, in the county of New Haven and State of Connecticut, have invented a new and useful Improvement in Clinical-Thermometer Holders; and I do hereby declare the following, when taken in connection with the accompanying drawings and the letters of reference marked thereon, to be a full, clear, and exact description of the same, and which said drawings constitute part of this specification, and represent, in—

Figure 1, a side view of a clinical-thermometer holder constructed in accordance with my invention; Fig. 2, a sectional view thereof enlarged; Fig. 3, a plan view of the diaphragm detached.

This invention relates to an improvement in holders for clinical thermometers in which the holder is adapted to contain a disinfectant into which the thermometer may be inserted, so that each time the thermometer is withdrawn from its case it is in condition for use and avoids the necessity of repeated washing, which at the best is inconvenient and unsatisfactory; and the invention consists in the construction as hereinafter described, and particularly recited in the claim.

The holder consists of a tube A, of glass or other suitable material, of the proper length and size, closed at its lower end and adapted to receive a clinical thermometer B, which is somewhat longer than the holder. The open end of the tube is closed by a disk or diaphragm C, of rubber or other suitable material, having a small aperture D, through which the thermometer is forced. This disk or diaphragm may be secured to the open end of the tube in any desired manner. As herein shown, a collar E is placed around the open end of the tube and formed with a flange F, which overlaps the outer edge of the tube. On the upper face of this flange is an annular rib G. This collar has external threads H at its upper end to receive a coupling-sleeve I, the internal diameter of the lower end of which corresponds to and has threads J for engagement with the threads H on the collar E, while the upper end corresponds in diameter with the flange F, forming a shoulder K, in the lower face of which is an annular groove L, corresponding to the rib G on the flange F and so that the disk C may be clamped between the shoulder K and flange and be securely held. The upper end of the sleeve is externally threaded for the attachment to it of a cap M, said cap being recessed to set over the outer end of the thermometer B. Preferably the cap will be provided with an internal cushion O to bear upon the upper end of the thermometer.

The tube A is filled with any suitable disinfectant, such as glycerin and carbolic acid or a weak solution of bichlorid of mercury, sufficient material being placed in the tube to cover the thermometer when it is placed therein. As the thermometer is forced into the tube the diaphragm stretches to permit its insertion, and while the thermometer is in the tube the diaphragm forms so close a packing about the thermometer that leakage is avoided, and when the thermometer is withdrawn the opening in the diaphragm is so small that it practically prevents the escape of the disinfectant. The edge of the diaphragm also acts as a wiper or stripper to remove the disinfectant from the surface of the thermometer, so that when the thermometer is withdrawn it is substantially dry and is ready for use.

With a holder of this character it is only necessary to insert the tube into the holder and withdraw the same to thoroughly clean and disinfect the thermometer.

I am aware that clinical-thermometer holders adapted to contain a disinfectant material into which the thermometer may be inserted and which are provided with means for wiping the thermometer as it is withdrawn from the holder are old, and therefore do not wish to be understood as claiming such as my invention.

Having fully described my invention, what I claim as new, and desire to secure by Letters Patent, is—

A holder for clinical thermometers comprising a tube, a collar secured to the open end thereof and having a flange extending inwardly over the open end of the tube and formed with an annular rib on its upper face, a sleeve surrounding the said collar and secured thereto and formed with a shoulder adapted to set over said flange and with a groove in said shoulder into which said rib may extend, a diaphragm located upon the upper face of said sleeve to which it is clamped by said collar, said diaphragm perforated to permit the thermometer to be passed through it into the tube, and a cap to close the outer end of said sleeve, substantially as described.

In testimony whereof I have signed this specification in the presence of two subscribing witnesses.

GEORGE E. NETTLETON.

Witnesses:
CLARA L. WEED,
FREDERIC C. EARLE.